(12) United States Patent
Daughtry

(10) Patent No.: US 7,550,683 B2
(45) Date of Patent: Jun. 23, 2009

(54) PORTABLE DIGITAL PLATE SCALE

(76) Inventor: Amanda Daughtry, 4158 Sequoia Rd., Memphis, TN (US) 38117-1636

(*) Notice: Subject to any disclaimer, the term of this patent is extended or adjusted under 35 U.S.C. 154(b) by 0 days.

(21) Appl. No.: 11/713,781

(22) Filed: Mar. 5, 2007

(65) Prior Publication Data

US 2008/0217073 A1   Sep. 11, 2008

(51) Int. Cl.
*G01G 21/28* (2006.01)
(52) U.S. Cl. ....................... 177/126; 177/262
(58) Field of Classification Search ............ 177/126, 177/127, 262
See application file for complete search history.

(56) References Cited

U.S. PATENT DOCUMENTS

| | | | |
|---|---|---|---|
| 2,314,387 A | | 3/1943 | Carlsson |
| 2,360,384 A | | 10/1944 | Quidas |
| 3,321,036 A | * | 5/1967 | Keenan et al. ............. 177/245 |
| 3,382,941 A | | 5/1968 | Novak |
| 3,387,676 A | | 6/1968 | Porter |
| 3,687,209 A | * | 8/1972 | Goldberg et al. ............ 177/233 |
| 4,043,413 A | | 8/1977 | Schaenen |
| 4,120,371 A | * | 10/1978 | Zohn et al. ................. 177/262 |
| 4,174,760 A | | 11/1979 | Curchod |
| 4,223,750 A | | 9/1980 | Perego |
| 4,286,680 A | | 9/1981 | Maltby et al. |
| 4,300,645 A | | 11/1981 | Sly et al. |
| 4,363,368 A | | 12/1982 | Paddon et al. |
| 4,387,777 A | * | 6/1983 | Ash ............................ 177/43 |
| 4,390,768 A | | 6/1983 | Teich et al. |
| 4,401,177 A | | 8/1983 | Haack |
| D274,991 S | | 8/1984 | Wirtz |
| 4,544,043 A | | 10/1985 | Stuart |
| 4,549,622 A | | 10/1985 | Leiman |
| D281,236 S | | 11/1985 | Muller et al. |
| 4,602,693 A | * | 7/1986 | Racicot ...................... 177/262 |
| 4,624,332 A | | 11/1986 | Mills |
| 4,631,393 A | | 12/1986 | Ross, Jr. |
| D288,071 S | | 2/1987 | Muller |
| 4,662,462 A | | 5/1987 | Kitagawa et al. |
| 4,711,313 A | * | 12/1987 | Iida et al. .................... 177/127 |
| 4,739,848 A | | 4/1988 | Tulloch |
| 4,800,973 A | | 1/1989 | Angel |
| 4,852,673 A | | 8/1989 | Asai et al. |
| 4,936,399 A | * | 6/1990 | Christman et al. ......... 177/210 C |
| 4,979,579 A | * | 12/1990 | Dardat et al. ............... 177/180 |
| 5,007,743 A | * | 4/1991 | Brennan ...................... 374/141 |
| 5,033,561 A | * | 7/1991 | Hettinger .................. 177/25.16 |
| 5,033,562 A | | 7/1991 | Cone |
| 5,044,453 A | | 9/1991 | Bankier et al. |
| 5,094,307 A | | 3/1992 | Aschke |

(Continued)

Primary Examiner—Randy W Gibson
(74) Attorney, Agent, or Firm—Walker, McKenzie & Walker, P.C.

(57) ABSTRACT

The invention at hand represents a dieter's food scale that fits within the base of a plate. It contains a plate scale, a supportive cord, and a digital interface. The supportive cord holds the digital interface firmly in place yet out from under the dinner plate so that an LCD on the digital interface can be clearly viewed. The scale is capable of weighing and displaying the weight of each serving while simultaneously memorizing and storing a weeks activity. A dieter can zero, reset and switch between grams and ounces. The invention at hand is small and compact so that it can be carried off site to use 24/7 in almost any environment. It is battery operated and automatically shuts off to preserve battery life.

5 Claims, 3 Drawing Sheets

U.S. PATENT DOCUMENTS

| | | | |
|---|---|---|---|
| 5,203,419 A * | 4/1993 | Douglas | 177/244 |
| 5,232,064 A | 8/1993 | Kroll et al. | |
| 5,388,043 A * | 2/1995 | Hettinger | 600/300 |
| 5,641,947 A * | 6/1997 | Riddle, Jr. | 177/126 |
| 6,426,471 B1 * | 7/2002 | Gubitose | 177/25.15 |
| 6,472,617 B1 * | 10/2002 | Montagnino | 177/126 |
| 6,516,221 B1 * | 2/2003 | Hirouchi et al. | 600/547 |
| 6,590,166 B2 * | 7/2003 | Yoshida | 177/25.13 |
| 6,608,261 B2 * | 8/2003 | Thadani | 177/126 |
| 6,765,155 B1 | 7/2004 | Gray | |
| 6,781,068 B2 * | 8/2004 | Zahriya et al. | 177/127 |
| 6,833,515 B1 * | 12/2004 | Kesselman | 177/126 |
| 7,256,357 B1 * | 8/2007 | Kesselman | 177/25.15 |
| 2002/0005301 A1 | 1/2002 | Rehm | |
| 2002/0079142 A1 * | 6/2002 | White | 177/25.16 |
| 2002/0124017 A1 * | 9/2002 | Mault | 707/509 |
| 2002/0137990 A1 * | 9/2002 | Cardoso | 600/300 |
| 2003/0168260 A1 | 9/2003 | Muyal | |
| 2004/0035614 A1 | 2/2004 | Zhang | |
| 2004/0118618 A1 * | 6/2004 | Davidson et al. | 177/25.13 |
| 2007/0050058 A1 * | 3/2007 | Zuziak et al. | 700/90 |

* cited by examiner

PORTABLE DIGITAL PLATE SCALE

TECHNICAL FIELD

The present invention relates to a portable weight-measuring device for monitoring the intake of food being served to a person.

BACKGROUND OF THE INVENTION

Today there are increasing large segments of the population concerned with their weight. Most reliable diet programs require a dieter scale to monitor portions of food and intake. This allows a dieter to control volume, calories, protein and total intake. The portions should be measured through all meals including breakfast, lunch dinner and snacks. Not all meals can be taken at home. Existing food scales can be cumbersome and difficult to use in a real environment. Even though there are many scales, none can be found that sit within the base of a plate, bowl or saucer. All other patented scales are designed to have an item such as a dinner plate sit upon them without consideration to portability, legibility or usefulness in real life situations. Thus there is a need for a safe, inconspicuous and portable device to measure the exact weight of food that the dieter will consume.

BRIEF SUMMARY OF THE INVENTION

The invention at hand resolves a dieter's safety issues in that it fits within the base of a dinner plate, allowing the dieter to simultaneously manage the scale and plate with one hand without the dinner plate slipping off the scale. This allows for safe and inconspicuous use of the scale. The scale plate is connected to a digital interface with readout via a flat, firm yet flexible cord that extends out from beneath the dinner plate so that the digital interface can be read and activated by the dieter, and allows the dieter to hold, monitor and activate the present invention while holding the dinner plate in one hand or by placing the scale and dinner plate on a counter or table. When not in use, the scale and digital interface can be folded together and easily fit with a pocketbook or jacket for safe-keeping and transportation. The invention at hand is battery operated with multiple features including automatic switch-off, weight hold, grams and ounces, and storage memory for the purpose of recalling previous portions and or storing measured portions throughout the day. The scale plate can be lifted from the scale for easy cleaning, and the scale plate itself is interchangeable with other scale plates to fit dinner plates, bowls and saucers.

DETAILED DESCRIPTION OF THE INVENTION

The invention has a scale and its scale plate surface A that fits within a dinner plate base E. It is understood that the majority of all dinner plates, saucers and bowls have a circular base with a lip F that leaves a space or indentation within the base E. The rim F of the dinner plate base E holds the scale plate A securely within the dinner plate rim, allowing the dieter to hold the scale and dinner plate securely in one hand. The invention at hand has a flat, stiff, flexible cable B that extends out from under the dinner plate so that it can electronically communicate between the scale plate A and digital interface C while securely supporting and holding the digital interface in place and in accessible view to the dieter.

Figure 1:
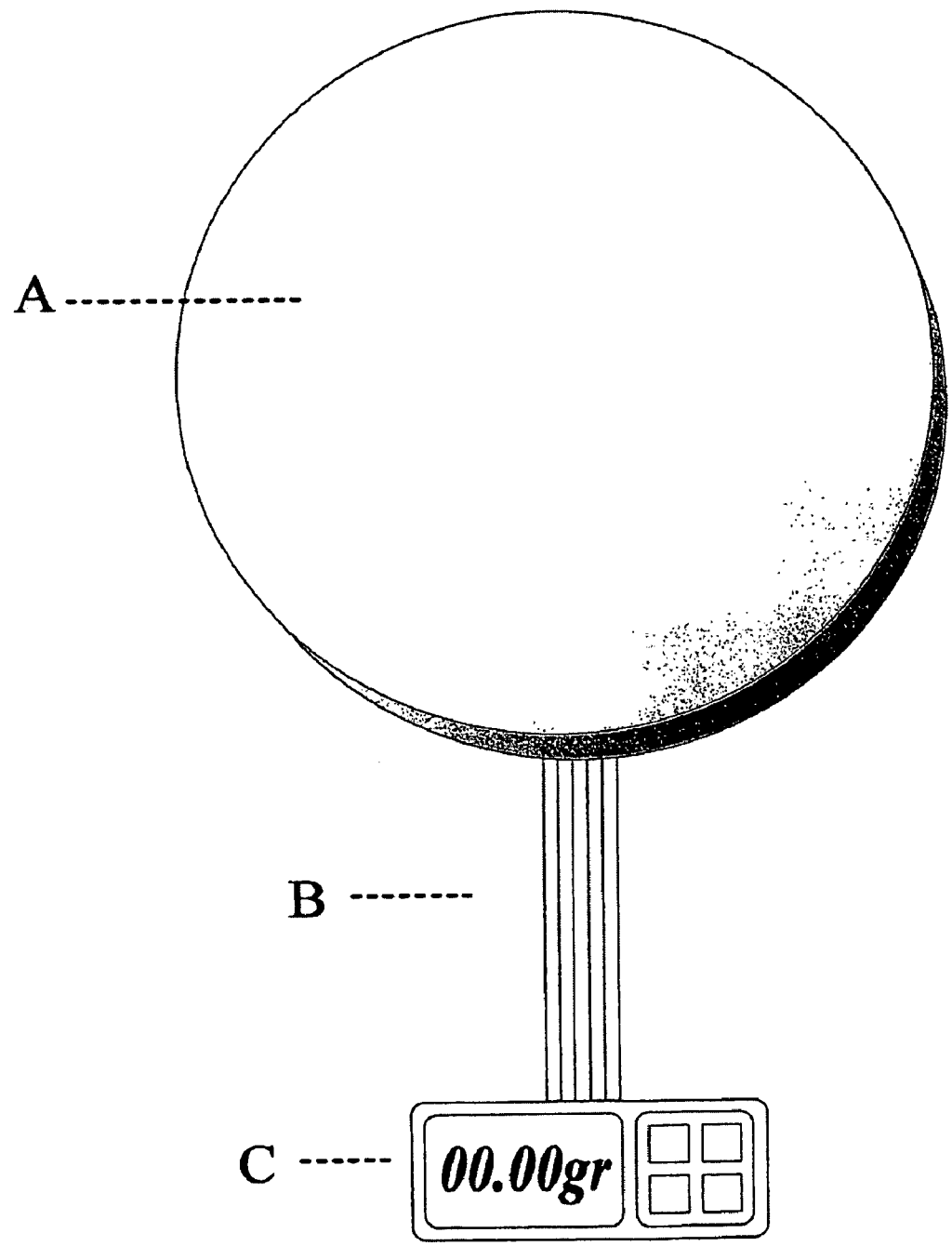
FIG. 1 shows the three main components of the invention.
Figure 2:
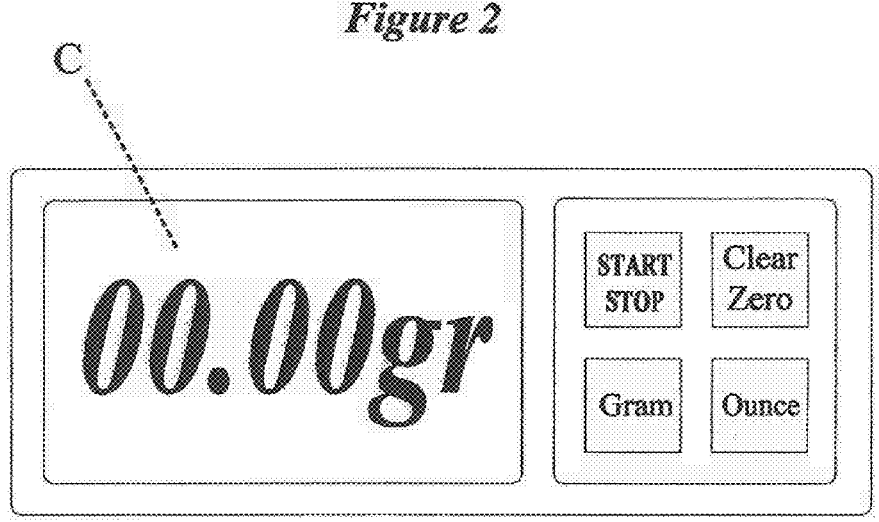
FIG. 2 is a close-up of the user-controllable digital interface with readout and a multitude of monitoring options.

The components of the drawings are not necessarily to scale. Items A, B and C are of the invention at hand. FIG. 1 shows the three main components of the invention. Item A is the plate scale. Item B is the flat cord and item C is the digital interface and read out. Plate scale A and digital interface and read out C are connected by cord B. Plate scale A is approximately 15 mm in thickness and between 50 mm and 150 mm in circumference depending on application. Plate scale A has a removable surface plate allowing access to mechanical scale interior. Flat cord B is approximately 3 mm thick and 25 mm wide and 130 mm long. Digital interface and read out C is approximately 60 mm×40 mm×20 mm.

Figure 3:
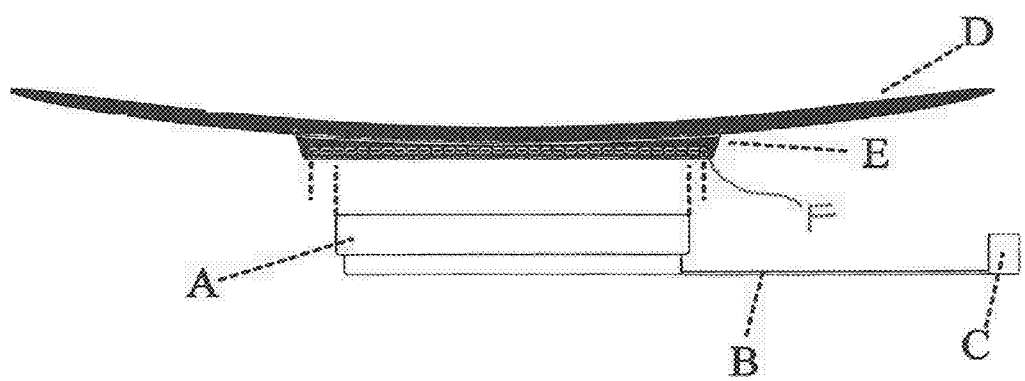
FIG. 3 shows the invention at hand viewed from the side with a dinner plate.

Items D and E are a common dinner plate, saucer or bowl. FIG. 3 shows the invention at hand viewed from the side with a dinner plate and lip D and dinner plate base E. FIG. 3 shows the fitment between plate scale A and dinner plate D. Flat cord B extends digital interface and read out C out from under plate D and its lip.

Figure 4:
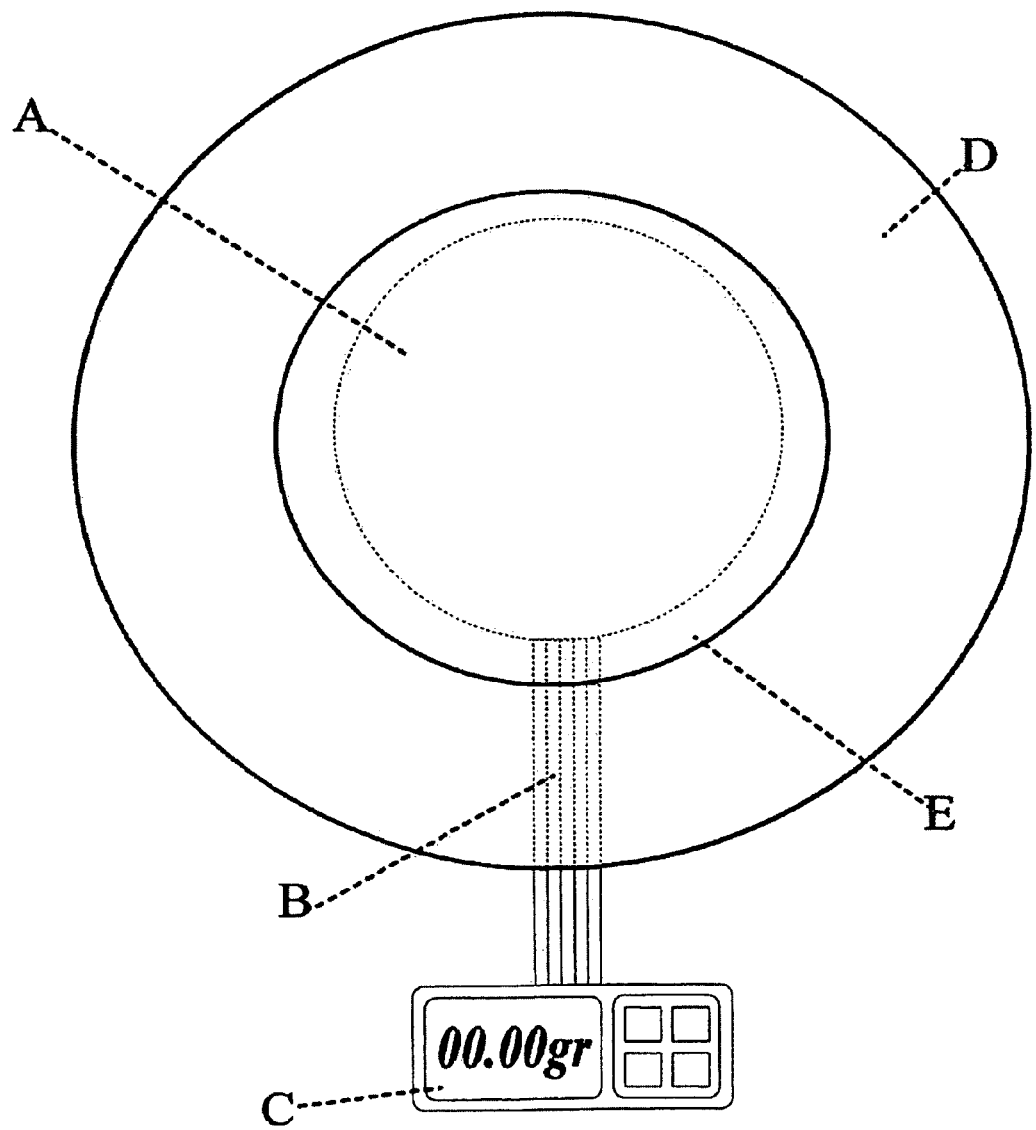
FIG. 4 is an above view of FIG. 3.
Figure 1:
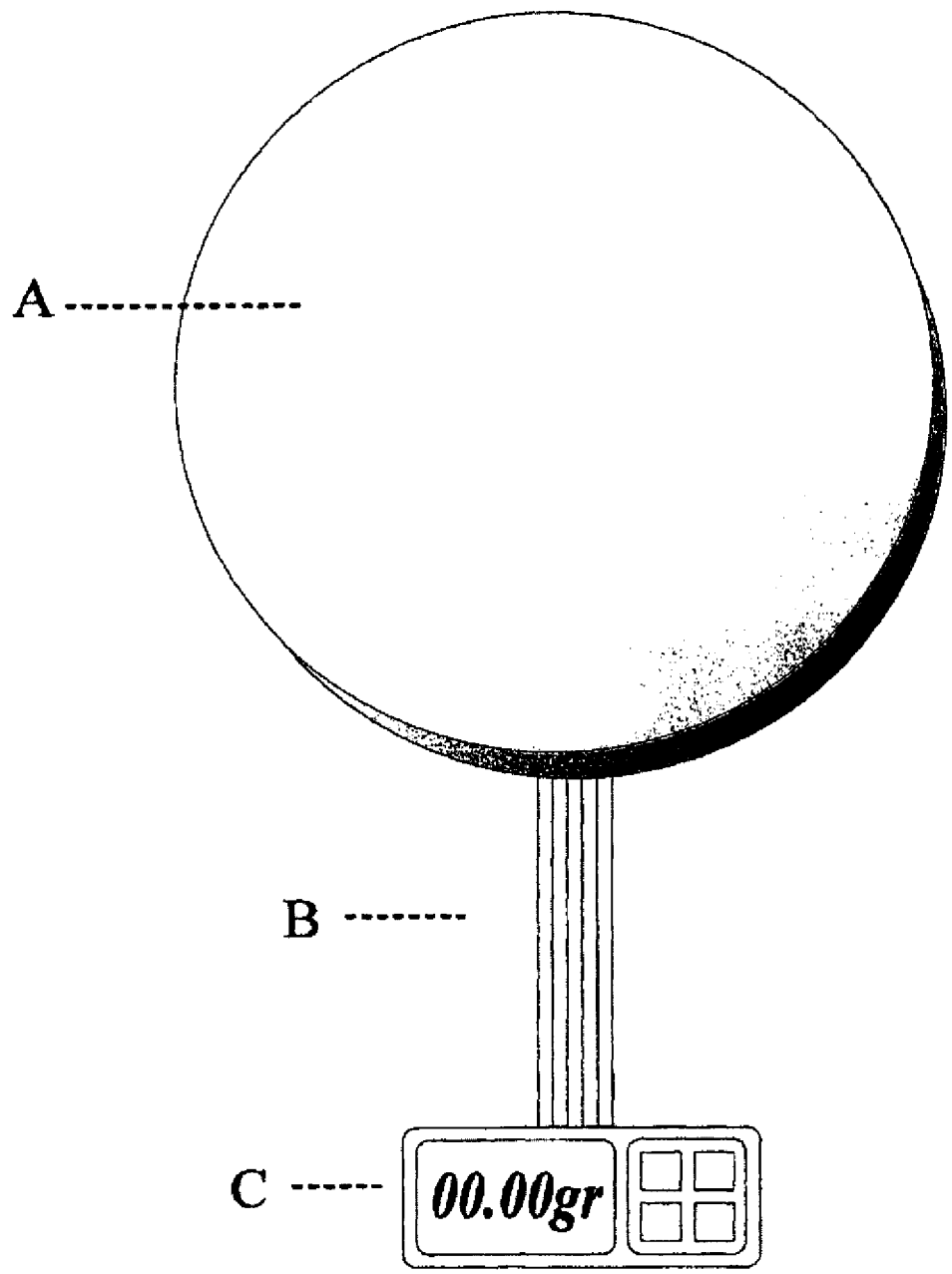
Figure 2:
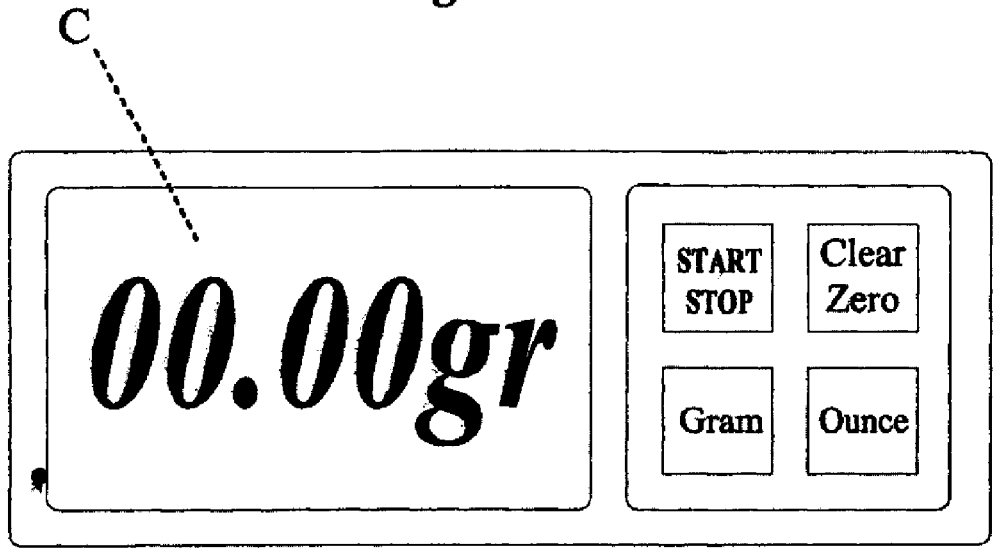
Figure 3:
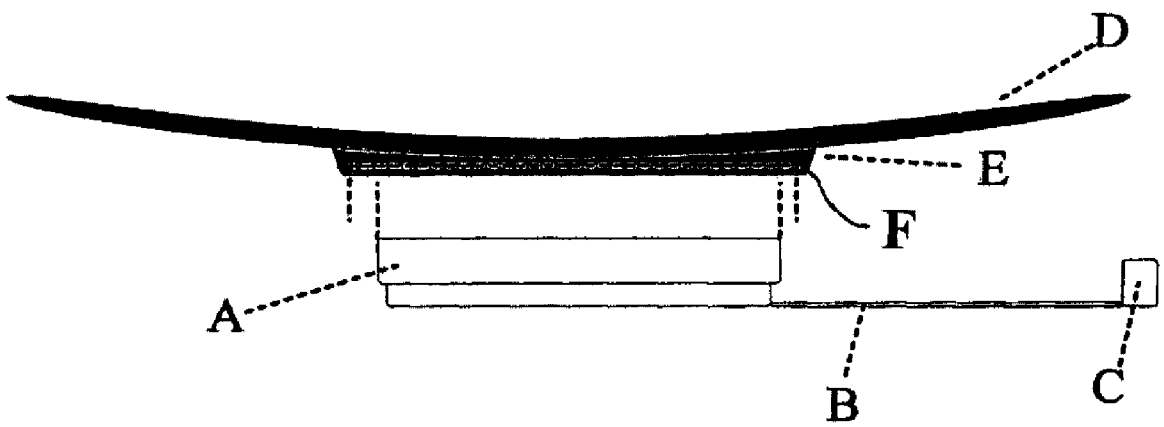
Figure 4:
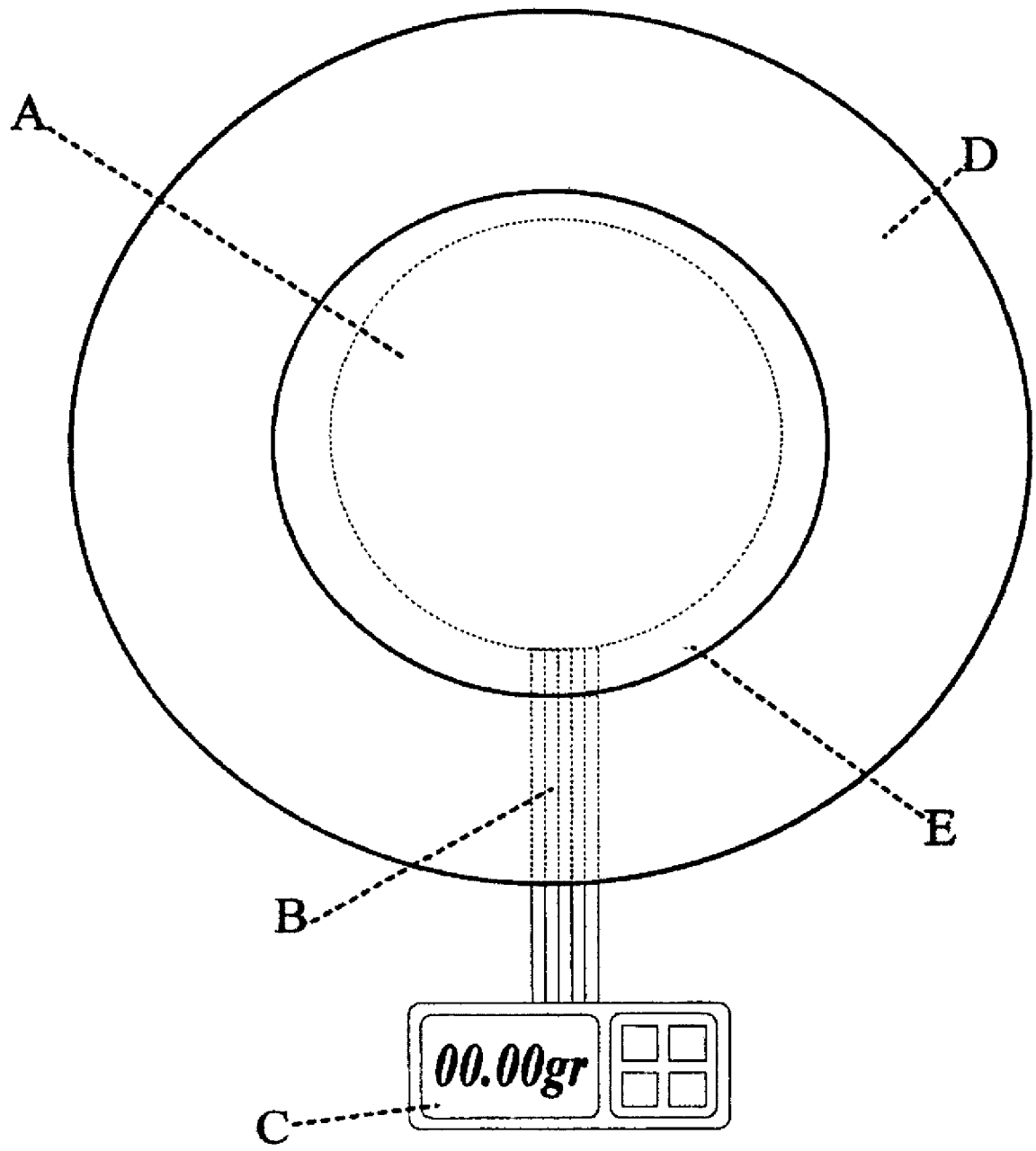

As seen in FIG. 4, scale plate surface A and item B are under plate and item C is extended out from under dinner plate D and base E. Scale plate surface A sits under and within base E. Flat cord B extends digital interface and read out C out from under plate D and base E.

The digital interface C allows a dieter to view the weight in grams or ounces between 0.01 gram and 2500 grams. A dieter can zero and reset the scale to eliminate the weight of the dinner plate as well as switch between grams, ounces and total accumulated weight. The digital interface C has a digital display that displays the measurement in bold, easy-to-read, numeric content. It can electronically store previous measurements from previous meals and portions so that the dieter can review his or her daily activity and intake. The invention at hand is battery operated and equipped with an energy-saving auto switch-off to preserve the life of the batteries. The cord B is firm enough to freely hold the digital interface perpendicular from the scale so that the digital interface can be manipulated by dieter yet flexible enough to allow folding. The cable B needs to be long enough to extend from under a dinner plate D so that the user can easily see and use the digital interface C. The size of the invention at hand is essential. The scale plate A needs to fit inside the plate base E and fill the spatial circumference of the base E, using the scale as a new and stable dinner plate base. The scale plate base shall remain small enough to make the device portable and easy to conceal. Via the flexible cable B, the scale and digital interface can be folded together.

The invention is thus seen to be a battery-operated portable digital dinner plate scale capable of supporting 5000 grams, comprising a plate scale surface A, a cord B, and a digital interface C. The scale plate surface A is approximately 15 mm thick and fits within the base E of a dinner plate, saucer or bowl D with such base measuring between 50 mm and 150 mm. The invention can include multi-sized or scaleable scale plate platforms A that are lightweight and water resistant. A flat, flexible, firm highly supportive interconnecting cord B, measuring approximately 3 mm×25 mm×130 mm long, is attached between scale plate A and digital interface C, and digital interface C is fully supported and suspended by cord B. The supportive cord holds the digital interface firmly in place yet out from under the dinner plate so that an LCD on the digital interface can be clearly viewed.

A user-controllable water resistant digital interface C is provided that is capable of displaying measurements between 0.01 to 2500 grams, and includes an off/off switch, a zero, a reset, and displays grams and ounces. A dieter can zero, reset and switch digital interface C between grams and ounces. Digital interface C has a storage memory for multiple events.

The scale is capable of weighing and displaying the weight of each serving while simultaneously memorizing and storing a week's activity. A dieter can zero, reset and switch between grams and ounces. The invention at hand is small and compact so that it can be carried off site to use 24/7 in almost any environment. It is battery operated and automatically shuts off to preserve battery life.

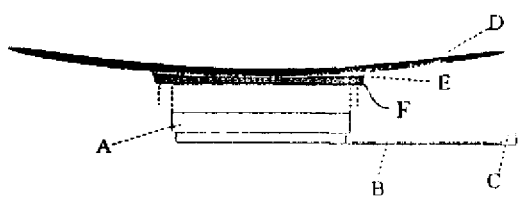
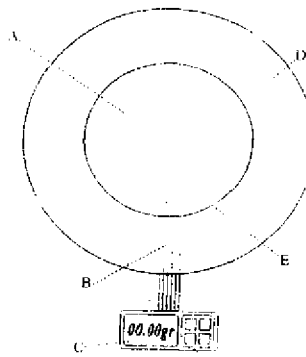

The invention claimed is:

1. In combination:
   (a) a portable digital plate scale for supporting and weighing a dinner plate, said dinner plate having a circular base with a downwardly-depending lip, said plate scale having an upwardly-facing scale plate surface adapted for securely fitting within said lip;
   (b) a digital interface and readout for displaying the weight supported upon said plate scale; and
   (c) a flexible flat cable joining said digital interface and readout to said plate scale, said cable being of a length permitting said digital interface and readout to extend from under said dinner plate for viewing from above.

2. The combination as recited in claim 1, in which said cable measures approximately 3 mm in thickness by 25 mm in width.

3. The combination as recited in claim 2, in which said cable measures approximately 130 mm in length.

4. The combination as recited in claim 3, in which said digital interface and readout includes an LCD display for displaying said weight supported upon said plate scale.

5. The combination as recited in claim 1, in which said digital interface and readout includes an LCD display for displaying said weight supported upon said plate scale.

* * * * *

UNITED STATES PATENT AND TRADEMARK OFFICE
CERTIFICATE OF CORRECTION

| | | |
|---|---|---|
| PATENT NO. | : 7,550,683 B2 | |
| APPLICATION NO. | : 11/713781 | |
| DATED | : June 23, 2009 | |
| INVENTOR(S) | : Amanda Daughtry | |

It is certified that error appears in the above-identified patent and that said Letters Patent is hereby corrected as shown below:

The Title Page, showing an illustrative figure, should be deleted and substitute therefor the attached Title Page.

Delete Drawing Sheets 1-3, and substitute therefor the Drawing Sheets, consisting of Figs. 1-4, as shown on attached pages.

Signed and Sealed this

Seventeenth Day of November, 2009

David J. Kappos
*Director of the United States Patent and Trademark Office*

(12) United States Patent
Daughtry

(10) Patent No.: US 7,550,683 B2
(45) Date of Patent: Jun. 23, 2009

(54) PORTABLE DIGITAL PLATE SCALE

(76) Inventor: Amanda Daughtry, 4158 Sequoia Rd., Memphis, TN (US) 38117-1636

( * ) Notice: Subject to any disclaimer, the term of this patent is extended or adjusted under 35 U.S.C. 154(b) by 0 days.

(21) Appl. No.: 11/713,781

(22) Filed: Mar. 5, 2007

(65) Prior Publication Data
US 2008/0217073 A1    Sep. 11, 2008

(51) Int. Cl.
*G01G 21/28* (2006.01)
(52) U.S. Cl. .................................. 177/126; 177/262
(58) Field of Classification Search .............. 177/126, 177/127, 262
See application file for complete search history.

(56) References Cited

U.S. PATENT DOCUMENTS

| | | | |
|---|---|---|---|
| 2,314,387 A | 3/1943 | Carlsson | |
| 2,360,384 A | 10/1944 | Quidas | |
| 3,321,036 A * | 5/1967 | Keenan et al. | 177/245 |
| 3,382,941 A | 5/1968 | Novak | |
| 3,387,676 A | 6/1968 | Porter | |
| 3,687,209 A * | 8/1972 | Goldberg et al. | 177/233 |
| 4,043,413 A | 8/1977 | Schaenen | |
| 4,120,371 A * | 10/1978 | Zohn et al. | 177/262 |
| 4,174,760 A | 11/1979 | Curchod | |
| 4,223,750 A | 9/1980 | Perego | |
| 4,286,680 A | 9/1981 | Maltby et al. | |
| 4,300,645 A | 11/1981 | Sly et al. | |
| 4,363,368 A | 12/1982 | Paddon et al. | |
| 4,387,777 A * | 6/1983 | Ash | 177/43 |
| 4,390,768 A | 6/1983 | Teich et al. | |
| 4,401,177 A | 8/1983 | Haack | |
| D274,991 S | 8/1984 | Wirtz | |
| 4,544,043 A | 10/1985 | Stuart | |
| 4,549,622 A | 10/1985 | Leiman | |
| D281,236 S | 11/1985 | Muller et al. | |
| 4,602,693 A * | 7/1986 | Racicot | 177/262 |
| 4,624,332 A | 11/1986 | Mills | |
| 4,631,393 A | 12/1986 | Ross, Jr. | |
| D288,071 S | 2/1987 | Muller | |
| 4,662,462 A | 5/1987 | Kitagawa et al. | |
| 4,711,313 A * | 12/1987 | Iida et al. | 177/127 |
| 4,739,848 A | 4/1988 | Tulloch | |
| 4,800,973 A | 1/1989 | Angel | |
| 4,852,673 A | 8/1989 | Asai et al. | |
| 4,936,399 A * | 6/1990 | Christman et al. | 177/210 C |
| 4,979,579 A * | 12/1990 | Dardat et al. | 177/180 |
| 5,007,743 A * | 4/1991 | Brennan | 374/141 |
| 5,033,561 A * | 7/1991 | Hettinger | 177/25.16 |
| 5,033,562 A | 7/1991 | Cone | |
| 5,044,453 A | 9/1991 | Bankier et al. | |
| 5,094,307 A | 3/1992 | Aschke | |

(Continued)

*Primary Examiner*—Randy W Gibson
(74) *Attorney, Agent, or Firm*—Walker, McKenzie & Walker, P.C.

(57) ABSTRACT

The invention at hand represents a dieter's food scale that fits within the base of a plate. It contains a plate scale, a supportive cord, and a digital interface. The supportive cord holds the digital interface firmly in place yet out from under the dinner plate so that an LCD on the digital interface can be clearly viewed. The scale is capable of weighing and displaying the weight of each serving while simultaneously memorizing and storing a weeks activity. A dieter can zero, reset and switch between grams and ounces. The invention at hand is small and compact so that it can be carried off site to use 24/7 in almost any environment. It is battery operated and automatically shuts off to preserve battery life.

5 Claims, 3 Drawing Sheets